Patented Mar. 3, 1942

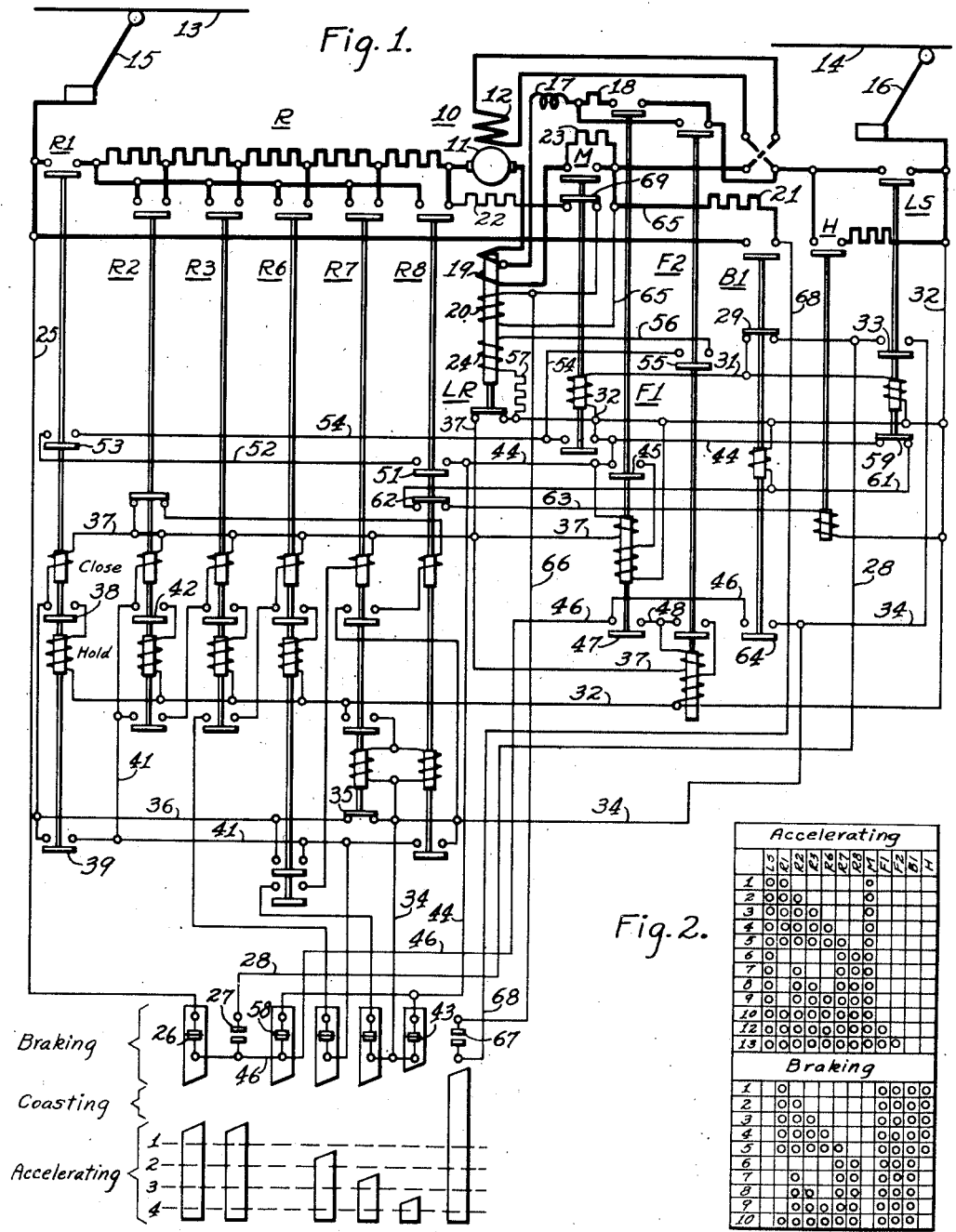

2,274,645

UNITED STATES PATENT OFFICE 2,274,645

MOTOR CONTROL SYSTEM

Bascum O. Austin, Forest Hills, Pa., assignor to Westinghouse Electric & Manufacturing Company, East Pittsburgh, Pa., a corporation of Pennsylvania Application July 26, 1940, Serial No. 347,690

8 Claims. (Cl. 172—179)

My invention relates, generally, to motor control systems and, more particularly, to systems for controlling dynamic braking of electric vehicles such as trolley coaches or buses.

An object of my invention, generally stated, is to provide a simple and efficient system for controlling the dynamic braking of a trolley coach or similar vehicle.

A more specific object of my invention is to reduce the amount of control equipment required for dynamic braking of a vehicle.

Another object of my invention is to improve the smoothness of operation of the dynamic brake for a vehicle.

A further object of my invention is to make the dynamic brake immediately responsive at all vehicle speeds within the range of the dynamic brake.

Still another object of my invention is to utilize a current limit relay for dual purposes in a motor control system.

Other objects of my invention will be explained fully hereinafter or will be apparent to those skilled in the art.

In accordance with my invention, the function of one of the switches previously utilized for establishing dynamic braking connections for a motor is combined with the field shunting switches, thereby reducing the number of switches required. The new arrangement also provides for the dynamic braking current to flow through the inductive shunt which is normally used for shunting the field winding of the motor when motoring, thereby adding smoothness to the dynamic brake. Spotting of the control equipment in accordance with decreasing coach speed during coasting is controlled by a spotting coil on the current limit relay which is also utilized to reduce the dynamic braking rate at high vehicle speeds.

For a fuller understanding of the nature and objects of my invention, reference may be had to the following detailed description, taken in conjunction with the accompanying drawing, in which:

Figure 1 is a diagrammatic view of a control system embodying the principal features of my invention; and Fig. 2 is a chart showing the sequence of operation of a portion of the equipment illustrated in Fig. 1.

Referring to the drawing, the system shown therein comprises a motor 10 having an armature winding 11 and a series field winding 12, a line switch LS and a switch M for connecting the motor to power conductors 13 and 14, thereby supplying power to the motors through current collectors 15 and 16, respectively; a dynamic braking switch B1, and a switch H for connecting the field winding 12 across the power conductors 13 and 14 during a portion of the dynamic braking cycle to insure that the dynamic braking action of the motor builds up quickly.

In order to control the motor current during the accelerating and dynamic braking periods, a resistor R is provided which is shunted from the motor circuit in a step-by-step manner by means of resistor shunting switches R1, R2, R3, R6, R7 and R8, which are actuated in sequential relation, as shown in the sequence chart in Fig. 2, during both the accelerating and braking cycles. A pair of field shunting switches F1 and F2 are provided for shunting the field winding 12 through a reactor 17 and a resistor 18 in order to secure maximum speed of the motor 10, in a manner well known in the art.

With a view to reducing the number of switches required for establishing the dynamic braking conditions for the motor 10, the field shunting switches F1 and F2 are utilized in conjunction with the switch B1 for establishing the dynamic braking circuit for the motor. In prior motor control systems of the present type, two braking switches have been required to complete the dynamic braking connections. In the present system, a function of one of the braking switches is performed by the field shunting switch, thereby reducing the number of switches required in the control equipment.

Furthermore, in the present system, the dynamic braking current flows through the inductive shunt 17 during the braking cycle, which shunt is normally used for shunting the field of the motor during the motoring cycle. The passing of the dynamic braking current through the inductive shunt adds smoothness to the dynamic brake, since the inductance of the shunt smooths out sudden changes of current during the notching or resistor shunting operations. In this manner, both the field shunting switches F1 and F2 and the inductive shunt 17 are utilized for dual purposes in the control system, thereby improving the performance of the vehicle and reducing the amount of equipment required.

In order that the sequence of operation of the resistor shunting switches and the field shunting switches may be controlled by interlock progression with a relatively few number of interlocks on these switches, each switch is provided with a closing coil and a holding coil. The closing coil is energized to close the switch, after which the holding coil is energized to retain the switch in the closed position, it being unnecessary to maintain the closing coil energized after the holding coil becomes energized.

In accordance with the usual practice, the progression of the resistor shunting switches both during acceleration and dynamic braking is automatically controlled by a current limit relay LR, thereby preventing an excessive amount of current flowing through the motor winding. The relay LR is provided with the usual series coil winding 19 which is connected in the armature circuit for the motor 10.

The relay LR is also provided with a spotting coil 20 which is connected in parallel circuit relation to a resistor 21 during coasting of the vehicle. The resistor 21 is connected in the armature circuit of the motor during both the coasting and the dynamic braking periods. In this manner, the energization of the coil 20 is proportional to the relatively low current which is permitted to circulate through the armature of the motor during coasting and the relay LR functions to operate the resistor shunting switches in accordance with any decrease in the vehicle speed, thereby making the dynamic brake immediately responsive at all vehicle speeds within the range of the dynamic brake.

When the full dynamic brake is applied, the coil 20 is connected across the motor armature in series with resistors 22 and 23. Therefore, the high voltage of the armature at high vehicle speeds excites the coil in proportion to this voltage and reduces the setting of the limit relay accordingly, thereby causing the relay to operate at a lower current and protecting the motor commutation at high vehicle speeds. In this manner, the relay LR is utilized to control the operation of the control equipment in accordance with the vehicle speed during coasting and also is utilized to protect the motor during dynamic braking at high vehicle speeds.

In addition to the windings 19 and 20, the relay LR is also provided with a shunt winding 24 which is energized when the control has completed its sequence of operation either during the accelerating or the braking cycle. The excitation of the shunt coil 24 causes the limit relay to be held in the open position. The holding of the limit relay in the open position disconnects all the closing coils of the resistor shunting switches and the field shunting switches and only the holding coils remain energized after the control sequence is completed. As fully explained in my copending application Serial No. 347,687, filed July 26, 1940, the energization of the coil 24 is controlled by interlocks provided on the resistor shunting switches and the field shunting switch F2. In this manner the temperature of the closing coils is materially reduced since they are no longer continuously energized and, furthermore, a saving in the energy required to operate the control equipment is effected.

As described and claimed in my foregoing copending application, dynamic braking, coasting and accelerating or application of power to the vehicle are all controlled by one controller MC which may be of the cam type and pedal operated, if desired. As shown, the controller MC is so constructed that one portion of the controller is utilized for dynamic braking, another portion for coasting and still another portion for accelerating. In the present controller, the positions of some of the cams so overlap that a portion of the dynamic braking circuit for the motor is established during coasting to permit sufficient current to circulate through the armature to cause the spotting action hereinbefore described to take place, thereby insuring that the control equipment is in the correct position to insure immediate response when the full dynamic brake is applied.

When the controller is actuated from its normal position, it passes through the braking position, the coasting position and then through the accelerating position, the maximum speed of the vehicle being obtained by actuating the controller to the full power position, at which time the switches F1 and F2 are closed to shunt the field winding of the motor. Beginning at the full power position, backward movement of the controller removes the field shunting circuit and inserts resistance in series with the motor, thereby softening the shut off of power. Further backward movement of the controller disconnects the motor armature from the power conductors and establishes the necessary connections for spotting the control equipment during coasting. Continued motion towards the normal position establishes the full braking connections after which the resistor shunting switches are closed to shunt the resistor R completely from the armature circuit.

In order that the functioning of the foregoing equipment may be more clearly understood, the operation of the system will now be described in more detail. Assuming that it is desired to accelerate the vehicle at the maximum rate, the controller MC is actuated to its last or full power position. Since it is assumed that the vehicle is started from standstill, nothing happens as the controller is moved through the braking and the coasting positions.

When the first accelerating position is reached, the switches LS, R1 and M are closed to connect the motor across the power conductors 13 and 14 in series with the resistor R. The energizing circuit for the actuating coil of the switch LS may be traced from the positive trolley conductor 13 through the current collector 15, conductor 25, contact members 26 and 27 of the controller MC, conductor 28, an interlock 29 on the switch B1, conductor 31, the actuating coil of the switch LS, conductor 32, and the current collector 16 to the negative conductor 14. The energizing circuit for the actuating coil of the switch M extends from the conductor 31 through the coil of the switch to the negative conductor 32.

Following the closing of the switch LS, the closing coil of the switch R1 is energized through a circuit which may be traced from the previously energized conductor 28 through an interlock 33 on the switch LS, conductor 34, an interlock 35 on the switch R7, conductor 36, the closing coil of the switch R1, conductor 37, and the contact members of the relay LR to the negative conductor 32. Following the closing of the switch R1, its holding coil is energized through an interlock 38 on the switch.

After the switch R1 is closed, the switch R2 is closed to shunt one step of the resistor R from the motor circuit. The energizing circuit for the switch R2 may be traced from the previously energized conductor 36 through an interlock 39 on the switch R1, conductor 41, the closing coil of the switch R2, conductor 37 and the contact members of the relay LR to the negative conductor 32. The holding coil of the switch R2 is energized through an interlock 42 on the switch when the switch is actuated to the closed position.

Following the closing of the switch R2, the switches R3, R6, R7 and R8 are closed by interlock progression in a manner well known in the art. As shown in the sequence chart, the switches R1, R2, R3 and R6 are opened upon the closing of the switch R7, thus the resistor R is connected in the motor circuit in two parallel paths and the switches R2, R3, R6 and R1 are closed in the order shown in the sequence chart to shunt the resistor completely from the motor circuit. Since the operation of the resistor shunting switches by interlock progression under the control of the relay LR is well known in the railway control art, it is believed to be unnecessary to trace all of the control circuits for these switches in detail.

As explained hereinbefore, the field shunting switches F1 and F2 are closed at the end of the accelerating cycle to shunt the field winding 12 through the reactor 17 and the resistor 18. The energizing circuit for the closing coil of the switch F1 may be traced from the previously energized conductor 34 through contact members 43, on the controller MC, conductor 44, the closing coil of the switch F1, conductor 37 and the contact members of the relay LR to the negative conductor 32. The holding coil for the switch F1 is energized through an interlock 45 when the switch is closed.

Following the closing of the switch F1, the switch F2 is closed. The energizing circuit for the switch F2 extends from the conductor 25 through contact members 26 of the controller MC, conductor 46, an interlock 47 on the switch F1, conductor 48, the closing coil of the switch F2, conductor 37, and the contact members of the relay LR to the negative conductor 32.

As described in my aforementioned copending application, the coil 24 of the relay R is energized at the end of the accelerating cycle, or, in other words, upon the closing of the switch F2 to open the contact members of the limit relay, thereby deenergizing the closing coils on the resistor shunting switches and the field shunting switches. The energizing circuit for the coil 24 may be traced from the previously energized conductor 44 through an interlock 51 on the switch R8, conductor 52, an interlock 53 on the switch R1, conductor 54, an interlock 55 on the switch F2, conductor 56, the coil 24 and resistor 57 to the negative conductor 32.

If it is desired to permit the vehicle to coast, the controller MC is actuated to the coasting position, thereby disconnecting the armature winding of the motor from the power conductors. As explained hereinbefore, the dynamic brake connections are established for the motor while the vehicle is coasting. However, the coil 20 on the relay LR is energized at this time in accordance with the current which is circulating through the motor and the limit relay LR functions to prevent the resistor shunting switches from closing to shunt the resistor R from the motor circuit unless the vehicle decreases in speed with a consequent decrease in the motor current.

It will be understood that a relatively low motor current circulates through the motor when all of the resistance is in the motor circuit. Therefore, no appreciable braking effect occurs. Should the vehicle decrease in speed, the relay LR permits the resistor shunting switches to close to shunt the resistor R until a point is reached at which the number of switches remaining closed corresponds to the vehicle speed. In this manner, immediate response of dynamic braking is assured in the event that the controller is actuated to the full braking position, in which position the energization of the coil 20 is no longer in accordance with the motor current, but is proportional to the motor voltage. Thus the relay LR functions to prevent excessive current at high motor speeds.

When the controller is actuated to the coasting position, the switches R1, F1, F2, B1 and H are closed. The energizing circuit for the actuating coil of the switch B1 may be traced from the conductor 46 through contact members 58 from a controller MC, conductor 44, an interlock 59 on switch LS, conductor 61 and the coil of the switch B1 to the negative conductor 32. The energizing circuit for the switch H extends from the conductor 61, through an interlock 62 on the switch R8, conductor 63 and the coil of the switch H to the negative conductor 32.

Following the closing of the switch B1, the switch R1 is closed. The energizing circuit for the closing coil of the switch R1 may be traced from the conductor 46, through an interlock 64 on the switch B1, conductor 34, the interlock 35 on the switch R7, conductor 36 and the closing coil of the switch R1, conductor 37, and the contact members of the relay LR to the negative conductors 32. The switches F1 and F2 are closed at this time since the conductor 44 is energized through the contact members 58 of the controller MC.

As explained hereinbefore, the coil 20 of the relay LR is connected in parallel circuit relation to a resistor 21 which is connected in the motor circuit during both the coasting and braking operations. The circuit through the coil 20 may be traced from one terminal of the resistor 21 through conductor 65, the coil 20, conductor 66, contact members 67, on the controller MC, conductor 68, to the other terminal of the resistor 21. In this manner, the coil 20 is energized by the voltage drop across the resistor 21, which voltage drop is proportional to the motor current. Therefore, the relay LR functions to prevent the further operation of the resistor shunting switches unless the coach decreases in speed with a corresponding decrease in the motor current.

When the controller MC is actuated to the full braking position, the circuit through the contact members 67 on the controller is interrupted. Therefore, the coil 20 is no longer connected across the resistor 21 but is connected across the armature 11 of the motor through the resistor 22, an interlock 69 on the switch M, conductor 71, the coil 20, conductor 65, the resistor 23, and the series winding 19 of the relay LR to the other terminal of the armature 11. Thus the coil 20 is energized in accordance with the voltage generated by the armature and the high voltage on the armature at high coach speeds excites the coil to reduce the setting of the limit relay accordingly to improve the motor commutation at high coach speeds. Under normal conditions of operation, the coil 20 has little effect when connected across the motor armature in series with the aforementioned resistors and the relay operates to permit the closing of the resistor shunting switches during dynamic braking in the usual manner.

It will be noted that the switch H is deenergized upon the closing of the switch R8, thereby disconnecting the field winding 12 from the power conductors. However, since the field winding is connected in the armature circuit, it is excited by the armature current, thereby continuing the braking action of the motor until the vehicle has decelerated to the speed at which the dynamic braking fades out.

As described in my aforesaid copending application, the coil 24 of the limit relay LR is energized at the end of the braking sequence, that is, when the operation of the resistor shunting switches is completed. In this manner, the relay LR is actuated to its raised position to deenergize the closing coils of the resistor shunting switches, after they have completed their sequence of operation during dynamic braking, in the same manner as during acceleration.

From the foregoing description it is apparent that I have reduced the amount of equipment required to provide for dynamic braking of an electrically propelled vehicle, since the field shunting switches are utilized to establish the dynamic braking circuit as well as to shunt the field winding in the usual manner. Furthermore, the smoothness of dynamic braking is improved, without any increase in the apparatus, by causing the braking current to flow through the inductive shunt normally provided for shunting the field winding of the motor. Also, in the present system, the spotting coil on the limit relay is utilized for the dual purposes of controlling the spotting operation during coasting and reducing the braking rate at high speeds.

Since many modifications may be made in the apparatus and arrangement of parts without departing from the spirit of my invention, I do not wish to be limited other than by the scope of the appended claims.

I claim as my invention:

1. In a motor control system, the combination with a motor and a source of power therefor, of switching means for connecting the motor to the power source, a switch for shunting the field winding of the motor when the motor is connected to the power source, and a switch cooperating with said field shunting switch to establish dynamic braking connections for the motor by connecting the field winding and the armature winding of the motor in series-circuit relation through said field shunting switch.

2. In a motor control system, the combination with a motor and a source of power therefor, of switching means for connecting the motor to the power source, an inductive shunt, a field shunting switch for connecting said shunt in parallel-circuit relation to the field winding of the motor when the motor is connected to the power source, and a switch cooperating with said field shunting switch to establish dynamic braking connections for the motor by connecting the inductive shunt, the field winding and the armature winding of the motor in series-circuit relation through said field shunting switch.

3. In a motor control system, the combination with a motor and a source of power therefor, of switching means for connecting the motor to the power source, an inductive shunt, a field shunting switch for connecting said shunt in parallel-circuit relation to the field winding of the motor when the motor is connected to the power source and a switch cooperating with said field shunting switch to establish dynamic braking connections for the motor, said inductive shunt being connected in series-circuit relation with both the armature and the field windings of the motor during dynamic braking.

4. In a motor control system, the combination with a motor and a source of power therefor, of switching means for connecting the motor to the power source, an inductive shunt, a field shunting switch for connecting said shunt in parallel-circuit relation to the field winding of the motor when the motor is connected to the power source, a switch cooperating with said field shunting switch to establish dynamic braking connections for the motor, said inductive shunt being connected in series-circuit relation with the armature of the motor during dynamic braking, and a single controller for controlling the operation of said switching means and said switches during both acceleration and dynamic braking of the motor.

5. In a motor control system, the combination with a motor and a source of power for driving a vehicle, of switching means for connecting the motor to the power source, additional switching means for establishing dynamic braking connections for the motor, a resistor for controlling the motor current, switches for shunting the resistor, a relay responsive to the motor current for controlling the operation of the resistor shunting switches, a controller for controlling the operation of said switching means, and means on said relay for varying its operation during coasting of the vehicle, the energization of said means being controlled by said controller.

6. In a motor control system, the combination with a motor and a source of power for driving a vehicle, of switching means for connecting the motor to the power source, additional switching means for establishing dynamic braking connections for the motor, a resistor for controlling the motor current, switches for shunting the resistor, a relay responsive to the motor current during acceleration and dynamic braking for controlling the operation of the resistor shunting switches, a controller for controlling the operation of said switching means, said dynamic braking connections being established during coasting of the vehicle, and means on said relay responsive to the motor current during coasting for varying its operation, the energization of said means being controlled by said controller.

7. In a motor control system, the combination with a motor and a source of power for driving a vehicle, of switching means for connecting the motor to the power source, additional switching means for establishing dynamic braking connections for the motor, a resistor for controlling the motor current, switches for shunting the resistor, a relay responsive to the motor current during acceleration and dynamic braking for controlling the operation of the resistor shunting switches, a controller for controlling the operation of said switching means, said dynamic braking connections being established during coasting of the vehicle, and means on said relay responsive to the motor current during coasting for varying its operation, the energization of said means being controlled by said controller, said means on the relay being responsive to the motor voltage during dynamic braking.

8. In a motor control system, the combination with a motor and a source of power for driving a vehicle, of switching means for connecting the motor to the power source, additional switching means for establishing dynamic braking connections for the motor, a resistor for controlling the motor current, switches for shunting the resistor, a relay responsive to the motor current during acceleration and dynamic braking for controlling the operation of the resistor shunting switches, a controller for controlling the operation of said switching means, said dynamic braking connections being established during coasting of the vehicle, means on said relay responsive to the motor current during coasting for varying its operation, the energization of said means being controlled by said controller, said means on the relay being responsive to the motor voltage during dynamic braking and interlocking means associated with said switching means for controlling the energization of said means on the relay during dynamic braking.

BASCUM O. AUSTIN.